US009803271B2

(12) United States Patent
Bluemlhuber et al.

(10) Patent No.: US 9,803,271 B2
(45) Date of Patent: Oct. 31, 2017

(54) THERMAL COATING METHOD

(71) Applicant: Bayerische Motoren Werke Aktiengesellschaft, Munich (DE)

(72) Inventors: Wolfgang Bluemlhuber, Munich (DE); Wolfram Wagener, Niedenstein (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 427 days.

(21) Appl. No.: 13/800,046

(22) Filed: Mar. 13, 2013

(65) Prior Publication Data
US 2013/0196074 A1 Aug. 1, 2013

Related U.S. Application Data

(63) Continuation of application No. PCT/EP2011/003932, filed on Aug. 5, 2011.

(30) Foreign Application Priority Data

Sep. 14, 2010 (DE) .................. 10 2010 045 314

(51) Int. Cl.
C23C 4/12 (2016.01)
C23C 4/00 (2016.01)
(Continued)

(52) U.S. Cl.
CPC .............. C23C 4/005 (2013.01); B23K 9/048 (2013.01); C23C 4/01 (2016.01); C23C 4/12 (2013.01);
(Continued)

(58) Field of Classification Search
CPC ................................... C23C 4/125
See application file for complete search history.

(56) References Cited

U.S. PATENT DOCUMENTS 5,271,967 A * 12/1993 Kramer ............... C23C 4/12
29/888.061
5,384,164 A * 1/1995 Browning ............... 427/449
(Continued)

FOREIGN PATENT DOCUMENTS

WO      WO 89/12116 A1    12/1989
WO      WO 2008/117332 A2 10/2008
(Continued)

OTHER PUBLICATIONS

"Introduction to Thermal Spray Processing" in Handbook of Thermal Spray Technology, J. R. Davis, editor, ASM International and the Thermal Spray Society, 2004, pp. 3-13.*
(Continued)

Primary Examiner — Katherine A Bareford
(74) Attorney, Agent, or Firm — Crowell & Moring LLP

(57) ABSTRACT

A thermal coating method for applying a functional layer to a workpiece surface, particularly for applying a running surface coating to a cylinder running surface of a crankcase of an internal-combustion engine, includes the steps of: melting a coating material by use of a melting device, applying coating material droplets to the workpiece surface by use of a gas jet aimed at the workpiece surface, which gas jet blows coating material droplets from a melting location of the melting device onto the workpiece surface, and cooling or rapidly freezing the coating material droplets during their transport from the melting location to the workpiece surface.

15 Claims, 3 Drawing Sheets

(51) Int. Cl.
*C23C 4/18* (2006.01)
*B23K 9/04* (2006.01)
*C23C 4/131* (2016.01)
*C23C 4/01* (2016.01)
*B23K 101/00* (2006.01)

(52) U.S. Cl.
CPC .............. *C23C 4/131* (2016.01); *C23C 4/18* (2013.01); *B23K 2201/003* (2013.01); *B23K 2201/006* (2013.01)

(56) References Cited

U.S. PATENT DOCUMENTS

| | | | | |
|---|---|---|---|---|
| 5,671,634 A | * | 9/1997 | Donovan | G01N 19/04 73/150 A |
| 5,714,205 A | * | 2/1998 | Marantz et al. | 427/449 |
| 5,908,670 A | * | 6/1999 | Dunkerley | B05B 7/224 219/76.14 |
| 6,746,225 B1 | * | 6/2004 | McHugh | 425/130 |
| 2009/0056620 A1 | * | 3/2009 | Oda et al. | 118/300 |

FOREIGN PATENT DOCUMENTS

| | | | |
|---|---|---|---|
| WO | WO 2010/037548 A1 | | 4/2010 |
| WO | 2010112567 | * | 10/2010 |

OTHER PUBLICATIONS

English translation of Chinese Office Action dated Oct. 20, 2014 (Six (6) pages).
International Search Report dated Aug. 30, 2011 w/ English translation (four (4) pages).
German Office Action dated Jun. 27, 2011 w/ partial English translation (nine (9) pages).

* cited by examiner

Schnitt A-A

THERMAL COATING METHOD

CROSS REFERENCE TO RELATED APPLICATIONS

This application is a continuation of PCT International Application No. PCT/EP2011/003932, filed Aug. 5, 2011, which claims priority under 35 U.S.C. §119 from German Patent Application No. DE 10 2010 045 314.5, filed Sep. 14, 2010, the entire disclosures of which are herein expressly incorporated by reference.

BACKGROUND AND SUMMARY OF THE INVENTION

The present invention relates to a thermal coating method for applying a functional layer onto a workpiece surface, particularly a thermal coating method for applying a running surface coating to a cylinder running surface of a crankcase of an internal-combustion engine.

From the state of the art, methods are known for the coating of cylinder running surfaces of crankcases of internal-combustion engines. By means of coating the cylinder running paths, the stability of the pistons and of the crankcase is to be increased, and simultaneously the sliding resistance of the pistons in the cylinders is to be reduced. So-called PVD, plasma or other thermal coating methods are known, by which single-layer or multilayer systems can be produced which have layer thicknesses of between 1 μm and 5 μm or layer thicknesses of between 1 mm and 3 mm. Generally, it is endeavored to create layers which are highly compressed and have minimal pores in order to achieve wear and stability characteristics that are as uniform as possible and in order to minimize tension of material in the layer.

The production of such compactly constructed layers requires high expenditures. Normally, the work has to take place in a vacuum or in an inert-gas atmosphere in order to prevent a pre-solidification and the formation of oxides. After the coating of cylinder running surfaces, these surfaces usually still have to be refinished. This generally takes place by honing or grinding, which in turn has the result that the layers will then be very smooth and even. However, cylinder running surfaces should not be too smooth and even. For this reason, the ground or honed cylinder running surfaces are usually subsequently roughened or structured in a defined manner, for example, by laser honing, laser dotting, plateau honing or other methods which require relatively high expenditures.

It is an object of the invention to provide a thermal coating method which is particularly suitable as a coating method for applying a running surface coating to a cylinder running surface of a crankcase of an internal-combustion engine and which requires no, or comparatively low, finishing expenditures.

This and other objects are achieved according to the invention by a thermal coating method for applying a functional layer to a workpiece surface, particularly a thermal coating method for applying a running surface coating to a cylinder running surface of a crankcase of an internal-combustion engine. The method has the steps of: melting a coating material by use of a melting device; applying coating material droplets to the workpiece surface by way of a gas jet aimed at the workpiece surface, which gas jet blows coating material droplets from a melting location of the melting device onto the workpiece surface; wherein the coating material droplets are cooled or rapidly frozen during their transport from the melting location to the workpiece surface.

According to the invention, the running surface coating is produced of a coating material which is first melted by use of a melting device. The coating material may, for example, be a material containing iron, which is present as wire or powder. The coating material is melted in a continuous process. For this purpose, an electric arc may be generated, for example, between two or more wires consisting of coating material, which electric arc continuously melts off the wire ends. The molten coating material will then be transported by way of a gas jet to the workpiece surface to be coated. In this case, tiny "coating material droplets" are blown from the melting location, i.e. from the wire ends of the melting device, onto the workpiece surface. For the coating of cylinder running surfaces, the melting device may be constructed, for example, in the shape of a so-called "rotary lance", which is rotatable in the circumferential direction of the cylinder running surface to be coated and is displaceable in the longitudinal direction of the cylinder. By rotating the rotary lance in the circumferential direction of the cylinder and by a superimposed axial displacement of the rotary lance in the longitudinal direction of the cylinder, the entire running surface of a cylinder can be uniformly coated. The gas jet can be a compressed-air jet or a nitrogen jet.

In accordance with the invention, the coating material droplets are cooled or rapidly frozen during their transport from the melting location to the workpiece surface. Thus, in contrast to the coating methods known from the state of the art, coating material droplets are used which are pre-solidified or solidified. The acceleration of the coating material droplets onto the workpiece surface to be coated can, for example, take place in a cold environment—cooling chamber—or by use of a gas jet pre-cooled in a defined manner.

The cooling chamber may have a temperature that is in the range of between −40° C. and +5° C. The cooling chamber preferably has a temperature of approximately −20° C.

The coating or functional layer therefore consists of a plurality of coating material droplets that are pre-solidified or solidified in flight; i.e. of a combination of liquid or viscous deformed drops (also called flat cakes or lamellae) and pre-solidified globulitic drops which, after a honing of the functional layer, have a depth of 0.5 mm or more and generate "round oil pockets".

When pre-solidified coating material droplets are used, relatively thick, definedly porous, lamella-type coatings can be produced, which are very suitable for a use as cylinder running surfaces.

According to a further aspect of the invention, the coating material droplets are cooled to such an extent during their transport from the melting location to the workpiece surface that they solidify in an area close to the surface. In this case, an exterior droplet shell of the coating material droplets solidifies, whereas the coating material is still liquid in the droplet interior. The coating material droplets are cooled to such an extent that 2% to 15%, preferably approximately or exactly 10% of the volume of the coating material droplets pre-solidify during the "flying time" from the melting location to the workpiece surface.

Tests have shown that a temperature difference of at least 300 K should prevail between the "atmosphere" surrounding the coating material droplets and the liquidus temperature of the coating material. The "liquidus temperature" is the temperature at which liquid coating material starts to solidify when there is a falling below this temperature. The difference between the temperature of the molten coating material droplets at the melting location, i.e. at the wire ends, and the surrounding atmosphere, i.e. the temperature of the gas jet or the cooling chamber, should preferably amount to at least 300 K.

In order to achieve the desired pre-solidification of the areas of the coating material droplets close to the surface, the "flying time" of the coating material droplets, i.e. the time period which the coating material droplets require from the melting location to the workpiece surface, should amount to at least 0.2 seconds, preferably 0.5 seconds. Good results can be achieved when the distance between the melting location and the workpiece surface to be coated is in a range of between 5 mm and 200 mm. In tests, a distance of approximately 4 cm was found to be advantageous. When coating material droplets are used that are pre-solidified in this manner, they are deformed and aligned in rows when impacting on the workpiece surface as a result of their kinetic energy, however, without fusing with the adjacent droplets. This results in a layer that is traversed by fine lamellae and fissures of a defined size and dimension.

It is an advantage of such an "amorphous" coating that, during a subsequent surface treatment of the coating, a defined number of pre-solidified drops separates from the layer, which results in a surface topography having a plurality of undercuts and relatively "deep" oil pockets (depth of oil pockets greater than 0.5 mm), which is advantageous for use as a running surface for a piston of an internal-combustion engine. The reason is that lubricating oil may accumulate in the undercuts or oil pockets. During the operation of the internal-combustion engine, this will then result in the formation of a uniform oil film between the piston rings and the cylinder running surface.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
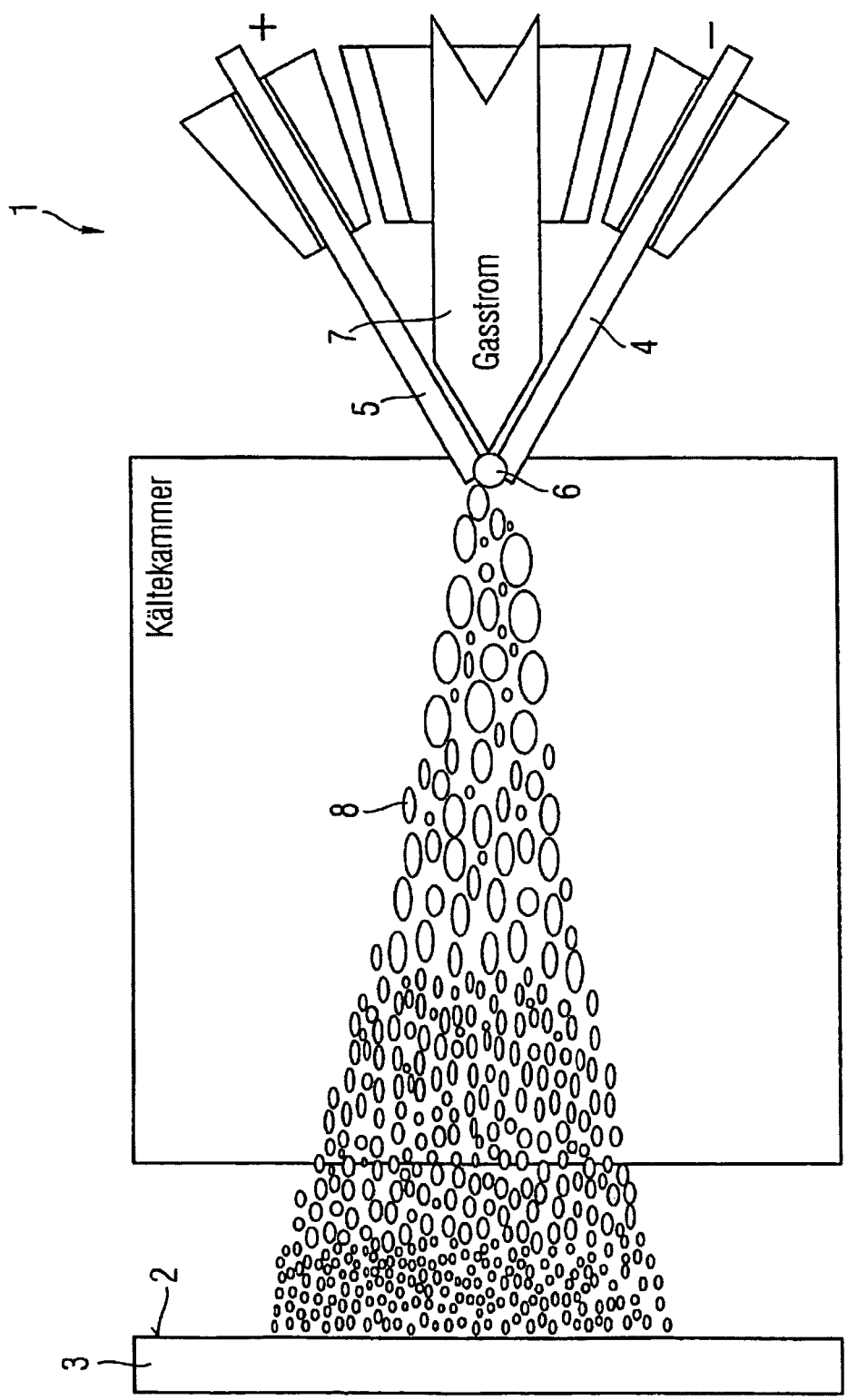
FIG. 1 is a schematic representation of a thermal coating device according to an embodiment of the invention.

FIG. 1 is a schematic representation of a thermal coating device 1 used for coating a cylinder running surface 2 of a crankcase 3 of an internal-combustion engine (not shown here in detail). The coating device 1 has two wire electrodes 4, 5, between which an electric arc 6 is generated. The two wire electrodes 4, 5 consist of a, for example, iron-based coating material. The wire electrodes 4, 5 are melted in the area of the electric arc 6. By use of a gas jet 7, very fine coating material droplets 8 are blown onto the workpiece surface 2. The coating device 1 may be constructed as a so-called "rotary lance", which can be rotated in the circumferential direction of the cylinder and can be axially moved in the longitudinal direction of the cylinder, whereby the interior cylinder side can be coated in a uniform manner.

The coating material droplets 8 are surrounded by a "cooling atmosphere". A cooling atmosphere can be achieved, for example, in that the coating is carried out in a cooling chamber. As an alternative or in addition, a cold-gas jet 7 can be used. It is important that the coating material droplets 8 are cooled during their transport from the melting location, i.e. from the area of the wire ends or of the electric arc 6, to the workpiece surface 2, and at least slightly pre-solidify on their surfaces.

For achieving a sufficient pre-solidification of their surfaces, the difference between the temperature of the melted coating material droplets 8 in the area of the electric arc 6 and the temperature of the gas jet 7 should be at least at 300 K. In other words, the (blow-out) temperature of the gas jet 7 should be at least 300 K below the liquidus temperature of the coating material.

Figure 2A:
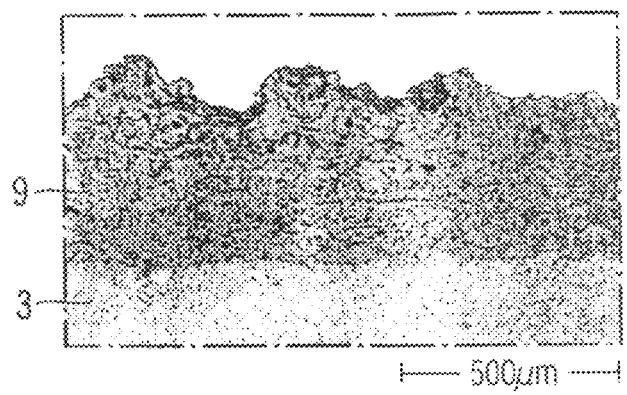
FIGS. 2a, 2b are sectional views of a coated cylinder running surface at different scales.
Figure 2B:
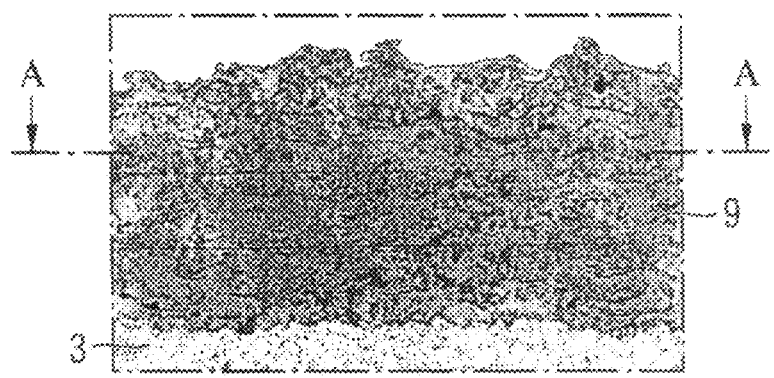

When coating material droplets pre-solidified in such a manner are used, these are deformed when they impact upon the workpiece surface 2 as a result of their kinetic energy without fusing with one another in the process. Pictorially speaking, one deformed coating material droplet is therefore "slapped" onto the other. As illustrated in FIGS. 2a, 2b, a functional layer 9 is thereby obtained on the workpiece 3 to be coated, which functional layer 9 is relatively porous and is traversed by lamellae, fissures and occlusions. FIGS. 2a, 2b show coated cylinder walls in a longitudinal sectional view of the cylinder.

Figure 2C:
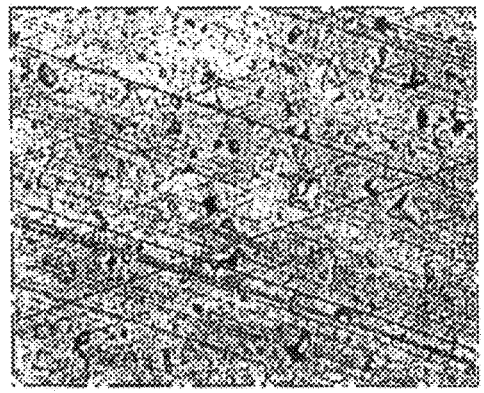
FIGS. 2c, 2d are micrographs taken along line A-A illustrated in FIG. 2b, of the sectional views illustrated in FIGS. 2a and 2b, respectively.
Figure 2D:
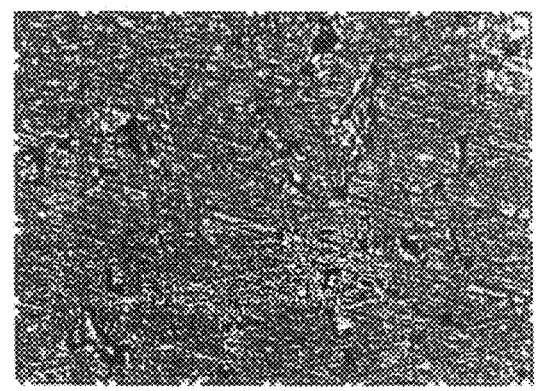

FIGS. 2c, 2d each illustrate, at different scales, sectional representations taken along intersection line A-A (compare FIG. 2b). A plurality of occlusions or undercuts which, in the case of a use as a cylinder running surface, operate as oil pockets, in which lubricating oil can accumulate, are clearly visible (particularly in FIG. 2d). During the operation of the internal-combustion engine, a very good and uniform lubrication is thereby achieved between the piston rings and the cylinder running surfaces.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A thermal coating method for applying a running surface coating to a workpiece surface, wherein the running surface coating applied to the workpiece surface is to a cylinder running surface of a crankcase of an internal combustion engine, the method comprising the acts of:
   melting a coating material by a rotary lance;
   blowing coating material droplets from a melting location of the rotary lance onto the workpiece surface by use of a gas jet directed toward the workpiece surface in order to apply the coating material droplets to the workpiece surface;
   cooling the coating material droplets during their transport from the melting location to the workpiece surface, by providing a blow distance between the melting location and the workpiece surface between 5 mm and 200 mm such that a material droplet flying time is between 0.2 seconds and 0.5 seconds, in order to solidify 2% to 15% of a volume of the coating material droplets during the material droplet flying time so as to form the running surface coating that is porous and traversed by lamellae, fissures and occlusions and also such that after a subsequent surface treatment, pre-solidified droplets separate from the coating resulting in oil pockets greater than 0.5 mm deep.

2. The thermal coating method according to claim 1, wherein the act of cooling is carried out by cooling or freezing the coating material droplets during the material droplet flying time from the melting location to the workpiece surface.

3. The thermal coating method according to claim 1, wherein, in an area between the melting location and the workpiece surface, the method generates a cooling atmosphere surrounding the coating material droplets.

4. The thermal coating method according to claim 3, wherein the cooling atmosphere is generated via a cooling chamber in which the cooling act occurs.

5. The thermal coating method according to claim 4, wherein the cooling chamber has a temperature ranging between −40° C. and +5° C.

6. The thermal coating method according to claim 5, wherein the cooling chamber temperature is approximately −20° C.

7. The thermal coating method according to claim 3, wherein the cooling atmosphere is generated using a cooled gas jet.

8. The thermal coating method according to claim 3, wherein a temperature difference of at least 300 K is achieved between the cooling atmosphere and a liquidus temperature of the coating material, wherein the liquidus temperature of the coating material is a temperature below which liquid coating material begins to solidify.

9. The thermal coating method according to claim 1, wherein the gas jet is one of a compressed-air jet and a nitrogen jet.

10. The thermal coating method according to claim 1, wherein the blow distance between the melting location and the workpiece surface is approximately 4 cm.

11. The thermal coating method according to claim 1, wherein 10% of the volume of the coating material droplets solidify during the material droplet flying time from the melting location to the workpiece surface.

12. A thermal coating method for applying a running surface coating to a workpiece surface, wherein the running surface coating applied to the workpiece surface is to a cylinder running surface of a crankcase of an internal combustion engine, the method comprising the acts of:

melting a coating material by a rotary lance;

blowing coating material droplets from a melting location of the rotary lance onto the workpiece surface by use of a gas jet directed toward the workpiece surface in order to apply the coating material droplets to the workpiece surface;

cooling the coating material droplets during their transport from the melting location to the workpiece surface, by providing a blow distance between the melting location and the workpiece surface between 5 mm and 200 mm such that a material droplet flying time is between 0.2 seconds and 0.5 seconds, in order to solidify 2% to 15% of a volume of the coating material droplets during the material droplet flying time such that the cooled coating material droplets have a kinetic energy upon impacting the workpiece surface that results in the cooled coating material droplets being deformed and aligned in rows without fusing adjacent droplets, thereby forming the running surface coating that is porous and traversed by lamellae, fissures and occlusions and also such that after a subsequent surface treatment, pre-solidified droplets separate from the coating resulting in oil pockets greater than 0.5 mm deep.

13. The thermal coating method according to claim 12, wherein, in an area between the melting location and the workpiece surface, the method generates a cooling atmosphere surrounding the coating material droplets.

14. The thermal coating method according to claim 13, wherein the cooling atmosphere is generated via a cooling chamber in which the cooling act occurs.

15. The thermal coating method according to claim 12, wherein the blow distance between the melting location and the workpiece surface is approximately 4 cm.

* * * * *